Feb. 25, 1947.  R. L. DE CORDOVA  2,416,572
WINDSHIELD WIPER AND DEFROSTER
Filed May 11, 1944  2 Sheets-Sheet 1
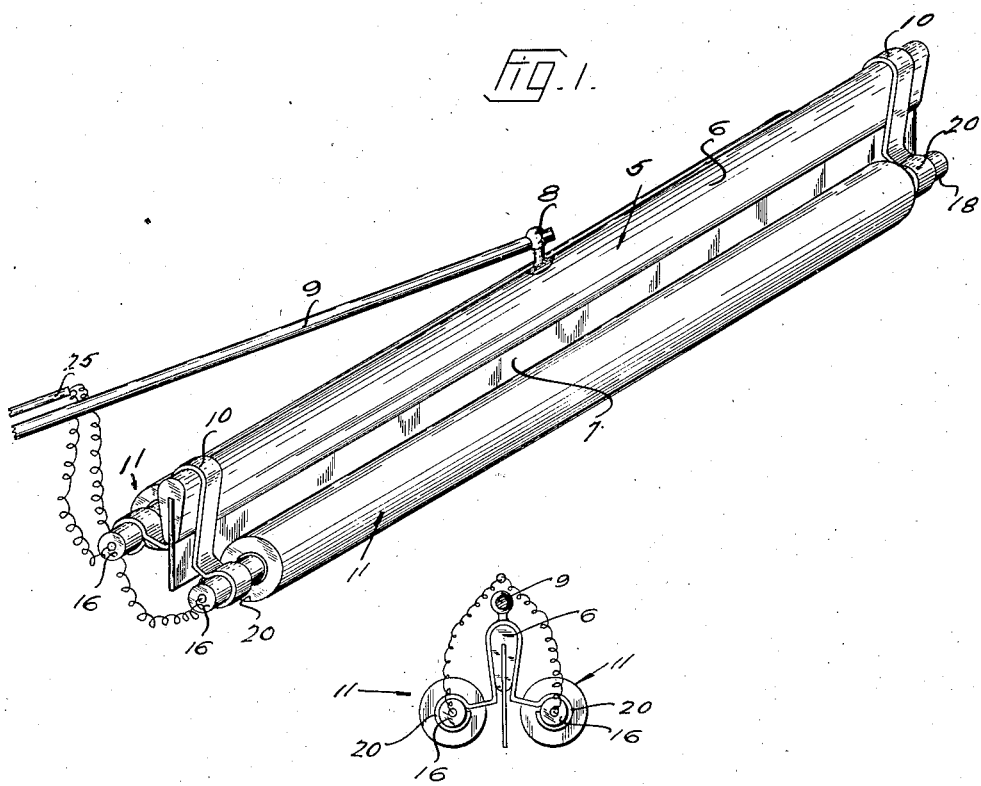
Inventor
REYES L. DE CORDOVA,
By Clarence A. O'Brien
and Harvey B. Jacobson
Attorneys Feb. 25, 1947.    R. L. DE CORDOVA    2,416,572
WINDSHIELD WIPER AND DEFROSTER
Filed May 11, 1944    2 Sheets-Sheet 2
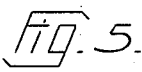
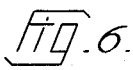
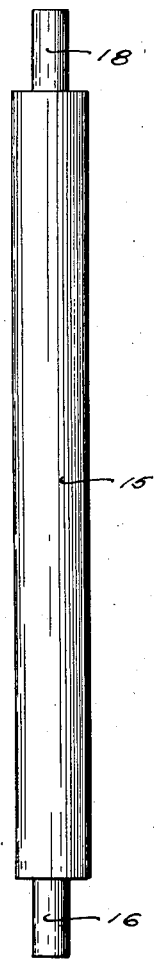
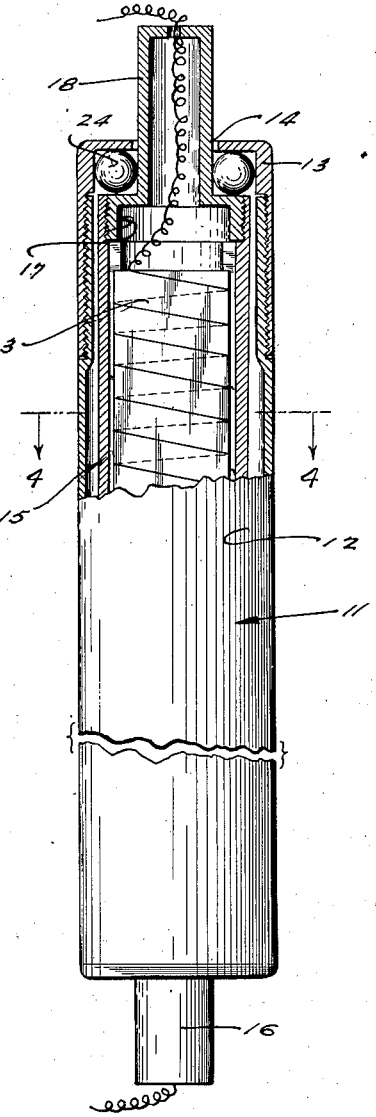
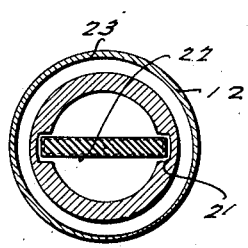
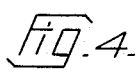
Inventor
REYES L. DE CORDOVA,
By *Clarence A. O'Brien and Harvey B. Jackson*
Attorneys Patented Feb. 25, 1947

2,416,572

UNITED STATES PATENT OFFICE 2,416,572

WINDSHIELD WIPER AND DEFROSTER

Reyes L. de Cordova, Tracy, Calif.

Application May 11, 1944, Serial No. 535,093

2 Claims. (Cl. 219—19)

This invention relates to new and useful improvements in windshield wipers and more particularly to a windshield wiper equipped with heating means for defrosting windshields.

The principal object of the present invention is to provide a combination heater and windshield wiper which will serve to prevent a windshield from freezing regardless of weather conditions.

Other objects and advantages of the invention will become apparent to the reader of the following description.

In the drawings:

Figure 1 represents a perspective view of the assembly.

Figure 2 is an end elevation.

Figure 3 is a fragmentary elevational view with a portion in section showing one of the heating drums.

Figure 4 is a section on the line 4—4 of Figure 3.

Figure 5 is a side elevational view of one of the heating units.

Figure 6 is a fragmentary side elevational view of the drum with the heating unit removed.

Referring to the drawings wherein like numerals designate like parts, it can be seen that numeral 5 generally refers to a windshield wiper having a back element 6 and a squeegee 7. The back 6 is attached as at 8 to an operating arm 9.

The yokes 10 are provided at the ends of the back 6 and embrace the back in such a manner as to hold a pair of heating drums 11, 11 in close spaced relation with respect to the opposite sides of the squeegee 7.

Each of these drums 11 consists of a shell or drum 12, closed at one end excepting for a small opening and provided with external threads at its opposite end to accommodate an internally threaded cap 13 which has a small opening 14 therein.

Inside of the drum 12 is a heating unit consisting of an elongated barrel 15 having a pin 16 projecting from one end and disposed through the opening in one end of the drum 12 while its opposite end has a threaded plug 17 with a hollow pin 18 projecting therefrom, the pin 18 projecting through the opening 14 in the cap 13. The pins 16, 18 are disposed into the loops 20 at the ends of the yokes 10 as shown in Figure 1.

Inside of the barrel 15, the side walls are formed with longitudinal grooves 21 for slidably receiving the edge portions of an elongated strip 22 of insulation on which is wound a heat wire 23, which when energized heats the entire drum structure, with the result that heat radiates therefrom onto a squeegee 7 and on to the adjacent windshield (not shown).

Ball bearings or the like 24 are interposed between the cap 13 and the plug 17 and like bearings may be provided between the opposite end of the barrel 15 and the adjacent end of the drum 12. The ends of the wire 23 (properly insulated) are led through openings in the ends of the hollow pins 18 and can extend into a suitable conduit 25 leading to a switch and source of current (not shown).

Obviously, as the assembly moves back and forth on a windshield, not only will the windshield be wiped, but heat radiating from the heating drums 11 will be applied to the windshield for always maintaining the windshield warm to prevent the accumulation of ice and other inclement conditions thereon.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A combined windshield wiper and defroster comprising a conventional motor driven movable wiper, yokes at the ends of the wiper, hollow closed heat radiating fixed cylinders provided with projecting trunnions supported by said yokes, on both sides of the wiper, closed cylindrical rollers covering said cylinders and supported for rotation on the same, an electric heat radiating unit within the hollow cylinders for heating the same by radiation and means for supplying said heating unit with current.

2. A combined windshield wiper and defroster, comprising a conventional motor driven movable wiper unit, yokes at the ends of said wiper, hollow closed heat radiating cylinders supported by said yokes, on both sides of said wiper, rotatable rollers closely surrounding said hollow cylinders, said rollers being adapted to roll on the surface of the windshield, ball bearings supporting said rollers for rotation on said cylinders, a flat heating unit including a base and a heating wire arranged within each of said cylinders, and adapted to heat the enclosing closed hollow cylinder by radiation and means for supplying current to said heating wires.

REYES L. DE CORDOVA.

REFERENCES CITED

The following references are of record in the file of this patent:

UNITED STATES PATENTS

| Number | Name | Date |
| --- | --- | --- |
| 607,093 | Snow | July 12, 1898 |
| 2,034,880 | Sackett | Mar. 24, 1936 |
| 1,980,590 | Knight | Nov. 13, 1934 |
| 1,790,544 | Hoover | Jan. 27, 1931 |
| 1,596,181 | Hills | Aug. 17, 1926 |
| 1,640,887 | Davis | Aug. 30, 1927 |
| 1,665,950 | Dwyer et al. | Apr. 10, 1928 |
| 1,845,465 | Wickstrom | Feb. 16, 1932 |